Nov. 14, 1950         W. J. MURRAY         2,529,624
REVIVIFICATION OF ADSORBENTS
Filed Oct. 13, 1948
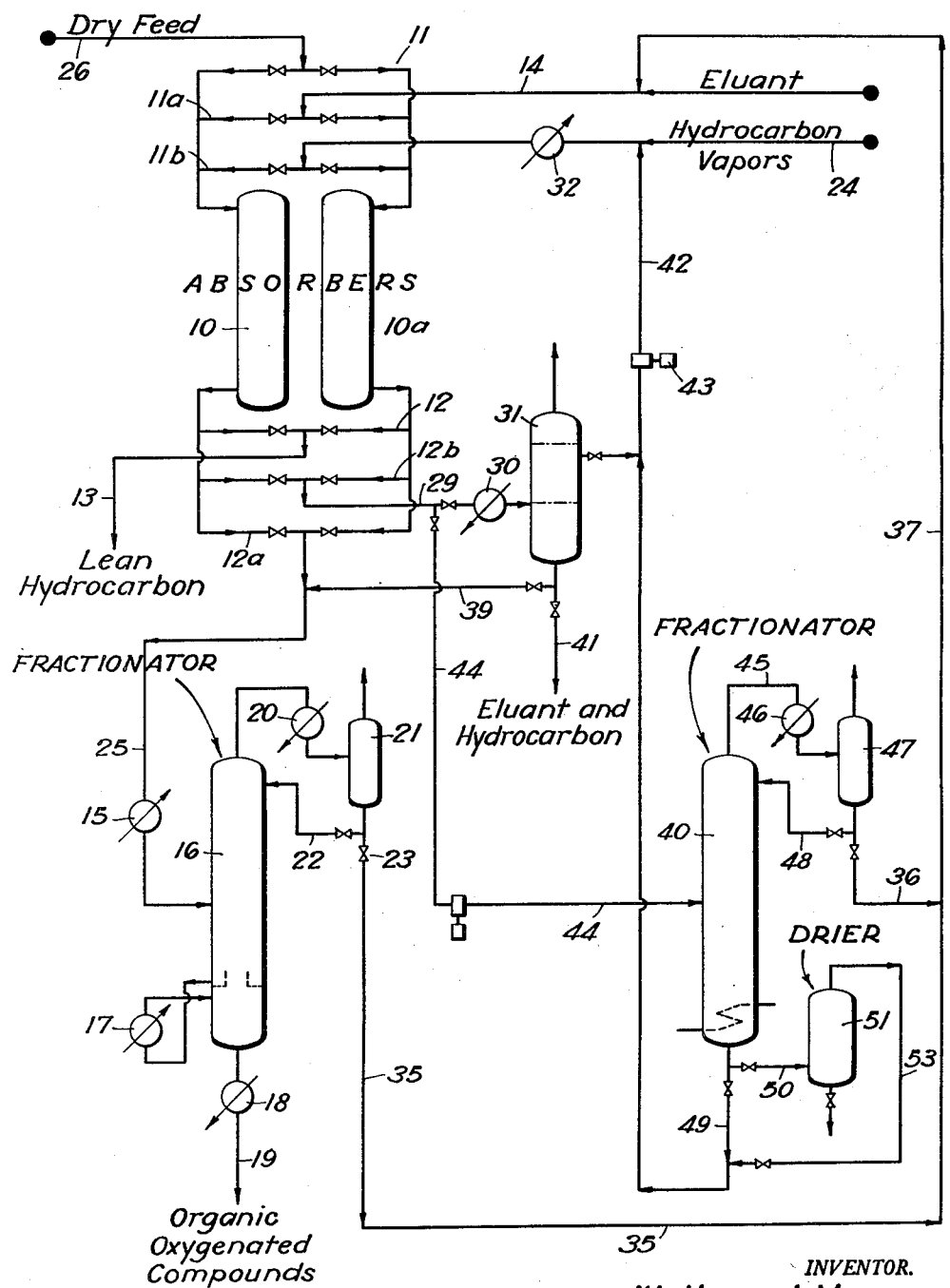
INVENTOR.
Wallace J. Murray
BY
Everett A. Johnson
ATTORNEY Patented Nov. 14, 1950

2,529,624

UNITED STATES PATENT OFFICE 2,529,624

REVIVIFICATION OF ADSORBENTS

Wallace J. Murray, Dedham, Mass., assignor, by mesne assignments, to Stanolind Oil and Gas Company, Tulsa, Okla., a corporation of Delaware Application October 13, 1948, Serial No. 54,314

4 Claims. (Cl. 260—450)

This invention relates to the separation and recovery of organic oxygenated compounds from mixtures thereof with hydrocarbons, and more particularly to a new combination process whereby organic oxygenated compounds may be removed substantially completely from solutions thereof.

Solutions of organic oxygenated compounds in hydrocarbons are frequently encountered in the chemical process industries, for example in the oxidation of hydrocarbons the product ordinarily contains a wide variety of the theoretically derivable organic oxygenated compounds together with unreacted hydrocarbons. As another example, the synthesis of hydrocarbons from carbon monoxide and hydrogen, particularly in the presence of an alkali-promoted iron catalyst, produces a wide variety of organic oxygenated compounds including carboxylic acids, ketones, aldehydes, and alcohols, in addition to liquid and gaseous hydrocarbons. The separation of such mixtures is an extremely difficult technical problem that has received the attention of experts in the art for many years and numerous processes have been devised to accomplish the desired result, but all are unsatisfactory for one reason or another. For example, all types of organic oxygenated compounds have been removed from hydrocarbon solutions by contacting the solutions with an adsorbent solid such as activated alumina, silica gel, or the like after which the oxygenated compounds are recovered from the adsorbent by steam distillation or by elution with a polar solvent followed by displacement of the eluant by means of fixed gases or by water vapor. Such processes have been found to be impractical or technically undesirable.

Air or other gas at a high temperature has been passed through the adsorbent to remove the eluant and such procedure ordinarily restores the adsorbent to a satisfactory and active condition but the recovery of the eluant removed from the adsorbent is very difficult, if not impossible. Furthermore, when air is used the mixture of hot air and solvent vapors present a considerable fire and explosion hazard. Superheated steam has been used, but this leaves the adsorbent wet with water and hot air blowing is necessary to remove the water in reactivating the adsorbent. Also, if the eluant is water soluble (and ordinarily this is very desirable), it is recovered as a dilute aqueous solution which requires drying before it can be reused.

In some cases the eluant can be recovered by washing with liquid water, but in that event the same difficulties as with the use of superheated steam are encountered, i. e. the adsorbent is wet with water and must be contacted with hot gases to restore its adsorbent properties. Another method which has been proposed is to remove the insoluble, non-volatile residues from the adorbent by burning. This, of course, completely destroys the valuable adsorbed material and in many cases the high temperatures resulting from the burning will ruin the adsorbent.

It is, therefore, a primary object of my invention to provide a system adapted to effect the separation and recovery of organic compounds from admixture with hydrocarbons. Another object of my invention is to effect a substantially complete removal of organic oxygenated compounds from adsorbents. A further object of my invention is to prolong the effective life of solid adsorbent materials in the separation of organic oxygenated compounds from hydrocarbons. It is also an object of my invention to provide a method and means for the recovery of an eluant from solid adsorbent materials. These and other objects of my invention will become apparent as the detailed description therof proceeds.

Briefly the invention contemplates the adsorption of organic oxygenated compounds from a hydrocarbon solution thereof by contacting with an adsorbent material. If desired, the bulk of the oxygenated compounds first can be removed from the hydrocarbon stream by contacting with solvents for the oxygenated compounds. The adsorbed organic oxygenated compounds can then be eluted from the solid adsorbent by a more polar material which may be an organic oxygenated compound. Some eluant remains upon the adsorbent, and this is displaced by contacting with a hydrocarbon vapor at an elevated temperature sufficient to vaporize the eluant. A gasiform stream of the eluant and hydrocarbon vapor is recovered and the eluant and hydrocarbon are separated.

The revivifying hydrocarbon vapor must be at a temperature sufficiently high to drive off the eluant from the adsorbent, must be a material easily separable from the eluant and must not injure the adsorbent if it is not removed completely from it. Generally hydrocarbons meet these requirements and I may use, for example, naphtha vapor or a single hydrocarbon, such as normal heptane. Other materials which are suitable are low-boiling paraffinic and naphthenic hydrocarbons, for example propane, butane, isobutane, pentane, isopentane, cyclopentane, hexanes, or the like or mixtures of such hydrocarbon vapors, as for example petroleum ether. In general, however, it is contemplated that I may use aromatic hydrocarbons, and saturated and olefinic aliphatic and cycloaliphatic hydrocarbons, but preferably a hydrocarbon having between about 3 and about 8 carbon atoms to the molecule. For example, I may use a narrow cut, i. e. a fraction boiling above about 100° C. and below about 150° C., of the hydrocarbon synthesis oil itself which includes a substantial proportion of olefins.

The mixture of eluant and revivifier vapors from the adsorption column or tower may pass to a separation zone. In many cases, the eluant and revivifier are immiscible in the liquid phase or are only slightly soluble in each other. Accordingly, the mixed vapors may be condensed and the two liquid phases separated. After separation, the liquid eluant and the vaporized revivifier can be returned to the appropriate stage in the process.

The eluant is preferably a solvent for the originally adsorbed material and the adsorbent has greater affinity for the eluant than for the material originally adsorbed so that it may replace the latter. This leaves the adsorbent saturated with the eluant but substantially free of the originally adsorbed material which was displaced by the eluant. Examples of a polar liquid which might be used are methanol, acetone, ethanol, acetone-methanol azeotrope, and the like. More specifically, the eluant is preferably a material which can be completely stripped from the adsorbent with hydrocarbon vapors leaving the adsorbent in a condition satisfactory for repeated use.

The adsorbents which are used according to my invention are those which cannot be revivified by steam alone. Thus, silica gel, alumina gel, and similar adsorbents cannot be revivified by steam since they hold water tenaciously and will not act as adsorbents when saturated with water. Furthermore, heating of the adsorbent rich with adsorbate may cause some polymerization thereof and a consequent fouling of the adsorbent. However, in accordance with my invention adsorbents of this general type are readily revivified since the adsorbate is displaced by the eluant and the eluant, in turn, is displaced by the hydrocarbon vapors, without adversely affecting the adsorbent properties even though some hydrocarbons might be retained within the adsorption zone.

To demonstrate the improved method, vapors of normal octane or a substantially non-aromatic naphtha boiling at about 150° C. or normal hexane were used to revivify a silica gel adsorbent. Not only was the eluant recovered from the adsorbent but the adsorbent remained active for repeated adsorption of organic oxygenated compounds from hydrocarbon solution.

Normal octane vapor at a temperature of between about 150 and 200° C. was passed through silica gel for about one hour to activate it. The gel was cooled and octane drained from the gel, but it remained wet with the hydrocarbon. A liquid fraction produced by synthesis from CO and $H_2$ was topped to 98° C., washed with a sodium carbonate solution to remove acids, and dried. This oil originally contained 0.271 equivalent of carbonyl compounds per liter by hydroxylamine titration and was passed through the column of silica gel. The treated oil contained only 0.041 equivalent. Thus 85% of the organic oxygenated compounds was removed by adsorption. Subsequently the gel was eluted with methanol. After elution, normal octane vapor was passed through the methanol-wet gel at 150–200° C. The vapors were then condensed and at first the condensate was in two phases, the top being methanol. The passing of the octane vapor was continued after the methanol ceased coming over and a total octane condensate was obtained. The octane condensate was washed with water to produce a pure octane fraction to be vaporized again and used to remove additional eluant from the silica gel.

The gel was then cooled and drained but left wet as in the first gel. The second cycle was run in the same way and 86.2% of the organic oxygenated compounds were removed. A third cycle was run with substantially the same recovery of the oxygenated material from the hydrocarbon solution.

Similar 3-cycle runs were made with naphtha and with commercial hexane as revivificant and the activity of the gel increased after each cycle.

The hydrocarbon solution containing organic oxygenated compounds to be recovered may be contacted with an immiscible alkaline solution, and after separating the phases, the pretreated hydrocarbon solution may be passed over an adsorbent solid material. More specifically, the charging stock may be contacted with an aqueous soap solution to remove a substantial proportion of the organic oxygenated compounds before the hydrocarbon stream containing residual oxygenated compounds is treated with a solid adsorbent material such as silica gel or an adsorbent conforming substantially to silica gel in adsorptive properties. If desired, the washed charging stock may be dried by distillation or by contacting with a solid such as anhydrous sodium sulfate or a liquid such as phosphoric acid having the property of selectively taking up water.

Referring to the flow sheet illustrated in the drawing, the dry charging stock is contacted at around 20 to 40° C. with an adsorbent solid, preferably silica gel or activated alumina. To effect the desired contact, a multiplicity of adsorption towers may be used, two of which, 10 and 10a, are illustrated. The columns are packed with granules of the desired adsorbent, and the charging stock is directed by suitable manifolding equipment 11 downwardly through the solid. Purified hydrocarbons, substantially free of organic oxygenated compounds, emerge from the bottom of the adsorber column 10 or 10a through exit manifold 12 and line 13. The flow of charging stock through one adsorber column, or through one group of adsorber columns, is continued until the efficiency of adsorption drops off. Then, the flow of charging stock is diverted to another adsorber column or group of columns, similarly packed with adsorbent, and a suitable eluant or liquid solvent is led by way of line 14 and inlet manifold 11a through the original column or columns to remove adsorbed organic oxygenated compounds therefrom as a step in the regeneration of the adsorbent solid. For this purpose, a polar liquid, such as methanol, acetone, ethanol, and the like, may be used. For example, a methanol-acetone azeotrope produced in the synthesis process is contemplated as an eluant.

The enriched eluant emerges through exit manifold 12a and is led through heater 15 into an intermediate point of fractionator 16, equipped with reboiler 17. Therein, the constituents of the stream are separated according to their relative boiling points. As illustrated, the oxygenated compounds are withdrawn from the bottom of the fractionator through cooler 18 and line 19, and the lower-boiling eluant, such as methanol, is distilled from the top of the fractionator through condenser 20 into reflux drum 21, from which a part is refluxed through line 22, and the remainder is withdrawn through valve 23 for recycling.

When the adsorbent solid has been washed or stripped substantially free of oxygenated compounds, the flow of eluting agent is stopped, and a suitable drying agent is introduced through line 24 and inlet manifold 11b into the adsorption column 10 or 10a. For this purpose I employ vaporous hydrocarbons at a temperature of between about 100° and 225° C., for example about 150–200° C. The eluting medium is removed thereby from the adsorbent solid, and the solid is left in condition for a new cycle of adsorption from hydrocarbon charging stock, elution and drying. The hydrocarbon plus eluant emerges through exit manifold 12b, and may be collected for recovery of the constituents thereof. Some hydrocarbons will remain on the adsorbent, but removal of such hydrocarbons from the gel is not required as they simply mix with the next portion of the hydrocarbon solution of oxygenated compounds to be treated.

In my improved method, a stream of hydrocarbon vapor is passed through the column at an elevated temperature and the mixture of eluant such as methanol and hydrocarbon vapors may be transferred by line 39 from manifold 12b either into fractionator 40 or separator 31 via cooler 30. When the eluant and hydrocarbon are immiscible, they may be separated by selectively condensing. Thus, the eluant may be condensed and withdrawn from the separator 31 by line 41 and the hydrocarbons removed overhead via line 42 and pump 43 and returned to the inlet manifold 11b via line 24 and heater or boiler 32. The stream in line 41 comprises primarily eluant with a small proportion of hydrocarbons. This eluant fraction may be fractionated in 16 along with the primary stream of eluant and eluted oxygenated compounds. Another method of clean-up is to fractionate the eluant-hydrocarbon mixture with heptane to produce an overhead azeotrope which breaks into two phases, the hydrocarbon phase being returned to the vaporizer or boiler 32. The eluant alcohol phase can be returned to the still until no more hydrocarbon comes over and the eluant is then ready for reuse. Alternatively, the residual hydrocarbon can be removed from the methanol eluant by a small addition of water, which can be removed before re-using the eluant.

Some of the eluant will be dissolved in the condensed hydrocarbons which may be removed, if desired, either by distillation or by water washing to produce a substantially pure hydrocarbon vapor fraction which may be used to remove the additional eluant. The wash water may be united with the water solution of water-soluble chemicals to be rectified therewith. Ordinarily, however, relatively small amounts of eluant may be tolerated in the hydrocarbon vapors. Alternatively, such a stream may be used for the bulk of the eluant contacting, and an eluant-free hydrocarbon vapor stream cut into the tower being regenerated near the end of the cycle.

Where the liquid eluant and liquid hydrocarbon are miscible, they may be passed by line 44 into the fractionator 40 and separated therein. Thus, when acetone is used as an eluant in place of methanol, and n-heptane is used for revivification, the two must be separated by fractionation, since they are miscible. The eluant vapor will be taken overhead through line 45, cooler 46, and reflux drum 47. A portion of the condensed eluant may be returned to fractionator 40 via line 48 but the bulk of the eluant may be recycled via line 36 with the recovered eluant from line 35 to the inlet manifold 11a via lines 37 and 14. The hydrocarbon fraction is withdrawn as bottoms from fractionator 40 via line 49 and recycled via line 42 and boiler 32 to the adsorption towers 10 or 10a via manifold 11b. In the preferred operation, however, water is removed from the hydrocarbon stream by drier 51 and returned to the main stream by line 53. It is contemplated, in any event, that the hot vapors entering manifold 11b should be substantially dry.

The various streams of oxygenated compounds may be further processed, either separately or after being mixed, by conventional means, such as by simple fractional distillation, extractive distillation with a selective solvent, or azeotropic distillation with a suitable entraining agent.

While the drawing illustrates adsorber columns containing stationary beds of adsorbing agent, with downward flow of process materials, it will be understood that numerous modifications may be made therein. For example, I may utilize upward flow through the adsorber columns, or combinations of upward and downward flow of the materials in the various stages of the adsorption-elution-regeneration process. As an advantageous modification, I may use adsorber columns containing moving beds of solids, and I may contact my charging stock, stripper medium, eluant, or drier concurrently with a moving bed, or preferably countercurrently. Numerous other modifications may be made in accordance with techniques well known in the art.

I claim:

1. In the process of recovering organic oxygenated compounds from a hydrocarbon stream containing dissolved carboxylic acids, ketones, aldehydes and alcohols wherein the bulk of the oxygenated compounds are removed from the hydrocarbon stream by extraction with a solvent and the remaining hydrocarbon stream is washed with water, dried, and contacted with a solid adsorbent for removing unextracted portions of the oxygenated compounds, the improved method of operation which comprises activating the adsorbent by contacting it at a temperature of 150° to 200° C. with the vapor of a hydrocarbon boiling within the naphtha boiling range whereby the adsorbent is wetted with said hydrocarbon, contacting the wetted adsorbent with said dried hydrocarbon containing unextracted oxygenated compounds at a temperature of about 20° to 40° C. for selectively adsorbing oxygenated compounds on the adsorbent and withdrawing hydrocarbons from which oxygenated compounds have thus been removed, subsequently contacting said adsorbent with an eluant which has a higher capacity for adsorption than the initially adsorbed oxygenated compounds and which is lower boiling than said initial oxygenated compounds whereby the initially adsorbed compounds are displaced, withdrawing the displaced compounds and unadsorbed eluant liquid and distilling the lower boiling eluant liquid from the higher boiling oxygenated compounds, subsequently displacing adsorbed eluant liquid from the adsorbent by contacting the adsorbent at a temperature between about 150° and 200° C. with a hydrocarbon boiling in the naphtha boiling range, removing displaced eluant with the major portion of the last named hydrocarbon while leaving the adsorbent wet with hydrocarbon and ready for further adsorption of oxygenated compounds, separating displaced eluant liquid from the hydrocarbon with which it is admixed, combining the eluant from the fractionation and separation steps and re-employing said combined eluant and said separated hydrocarbon respectively in repeated cycles as hereinabove set forth.

2. The method of claim 1 wherein the hydrocarbon boiling in the naphtha boiling range contains more than six, but less than 9, carbon atoms per molecule.

3. The method of claim 1 wherein the eluant is methanol.

4. The method of claim 1 wherein the eluant is an azeotropic mixture of methanol and acetone and the hydrocarbon boiling in the naphtha boiling range is heptane.

WALLACE J. MURRAY.

REFERENCES CITED

The following references are of record in the file of this patent:

UNITED STATES PATENTS

| Number | Name | Date |
|---|---|---|
| 2,464,311 | Hiatt et al. | Mar. 15, 1949 |

OTHER REFERENCES

U. S. Naval Technical Mission in Europe, "The Synthesis of Hydrocarbons and Chemicals From CO and $H_2$," page 88 (September, 1945).